(12) United States Patent
Sisbot

(10) Patent No.: US 9,682,477 B2
(45) Date of Patent: Jun. 20, 2017

(54) ROBOT COMMUNICATION OF INTENT AND FUNCTIONING

(71) Applicant: TOYOTA JIDOSHA KABUSHIKI KAISHA, Toyota-shi, Aichi-ken (JP)

(72) Inventor: Emrah Akin Sisbot, Mountain View, CA (US)

( * ) Notice: Subject to any disclaimer, the term of this patent is extended or adjusted under 35 U.S.C. 154(b) by 178 days.

(21) Appl. No.: 14/667,413

(22) Filed: Mar. 24, 2015

(65) Prior Publication Data

US 2016/0279793 A1    Sep. 29, 2016

(51) Int. Cl.
*B25J 9/16* (2006.01)

(52) U.S. Cl.
CPC ........... *B25J 9/1674* (2013.01); *B25J 9/1628* (2013.01); *B25J 9/1676* (2013.01); *Y10S 901/01* (2013.01); *Y10S 901/08* (2013.01); *Y10S 901/09* (2013.01)

(58) Field of Classification Search
CPC ...... B25J 9/1674; B25J 9/1676; B25J 9/1628; B25J 11/0005; G06T 1/0014; G05D 1/0246; G05B 2219/40196; G05B 2219/40202; G05B 2219/35506; G05B 2219/40161; G05B 2219/40169; G08B 5/36; B60Q 2400/50
See application file for complete search history.

(56) References Cited

U.S. PATENT DOCUMENTS 8,325,027 B2   12/2012   Tee et al.

2014/0039677 A1   2/2014   Moore
2015/0042485 A1*  2/2015   Suessemilch ...... G03B 21/2093
                                                 340/815.4
2015/0203023 A1*  7/2015   Marti ....................... B60Q 1/00
                                                 340/425.5

FOREIGN PATENT DOCUMENTS

JP        2013107184 A    6/2013

OTHER PUBLICATIONS

Matsumaru, K., "Mobile Robot with Preliminary-announcement and Display Function of Forthcoming Motion using Projection Equipment", The 15th IEEE International Symposium on Robot and Human Interactive Communication (RO-MAN06), Hatfield, UK, Sep. 6-8, 2006, pp. 443-450.

* cited by examiner

*Primary Examiner* — Adam Mott
(74) *Attorney, Agent, or Firm* — Burbage Law, P.C.; Jon-Michael Burbage

(57) ABSTRACT

The disclosure includes a method and a robot for projecting the one or more graphics on the surface of a user environment. The method may include determining robot velocity data describing one or more of an angular velocity and a linear velocity of the robot. The method may include determining graphical data describing one or more graphics for projection on the surface of a user environment based on the angular velocity and the linear velocity of the robot. The one or more graphics may include one or more arrows describing a past behavior of the robot and a pending behavior of the robot. The method may include projecting the one or more graphics on the surface of the user environment so that a user present in the user environment with the robot may have access to information describing the past and pending behavior of the robot.

20 Claims, 5 Drawing Sheets

ROBOT COMMUNICATION OF INTENT AND FUNCTIONING

BACKGROUND

The specification relates to using robot communication of intent and functioning.

Service robots are becoming increasing popular. These robots may provide assistance to the elderly or people with medical conditions. Service robots perform numerous tasks. For example, a service robot may be expected to handover objects to a user.

SUMMARY

According to one innovative aspect of the subject matter described in this disclosure, a method and robot for projecting one or more graphics on the surface of the user environment is described. One or more steps of the method may be executed by a processor programmed to execute that step. The method may include determining robot velocity data describing one or more of an angular velocity and a linear velocity of a robot. The method may include determining graphical data describing one or more graphics for projection on a surface of a user environment based on the angular velocity and the linear velocity of the robot. The one or more graphics may include one or more arrows describing a past behavior of the robot and a pending behavior of the robot. The method may include projecting the one or more graphics on the surface of the user environment so that a user present in the user environment with the robot may have access to information describing the past behavior of the robot and the pending behavior of the robot.

Other aspects include a processor and a tangible, non-transitory memory storing instructions for performing one or more of these methods when executed by the processor.

Throughout the disclosure, the term "data" may be used to represent any digital data undergoing the transfer functions or operations described herein. The digital data may include, but is not limited to, detected user data, user data, graphics data, electronic medical record data, network service data, robot pose data, robot path data, robot direction data, robot velocity data, data to be shared between two or more entities (e.g., servers, vehicle systems, mobile client devices, client devices, etc.) and data to be transferred between two or more entities.

The advantages of the system described herein are provided by way of example, and the system may have numerous other advantages.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

System Overview

Figure 1A:
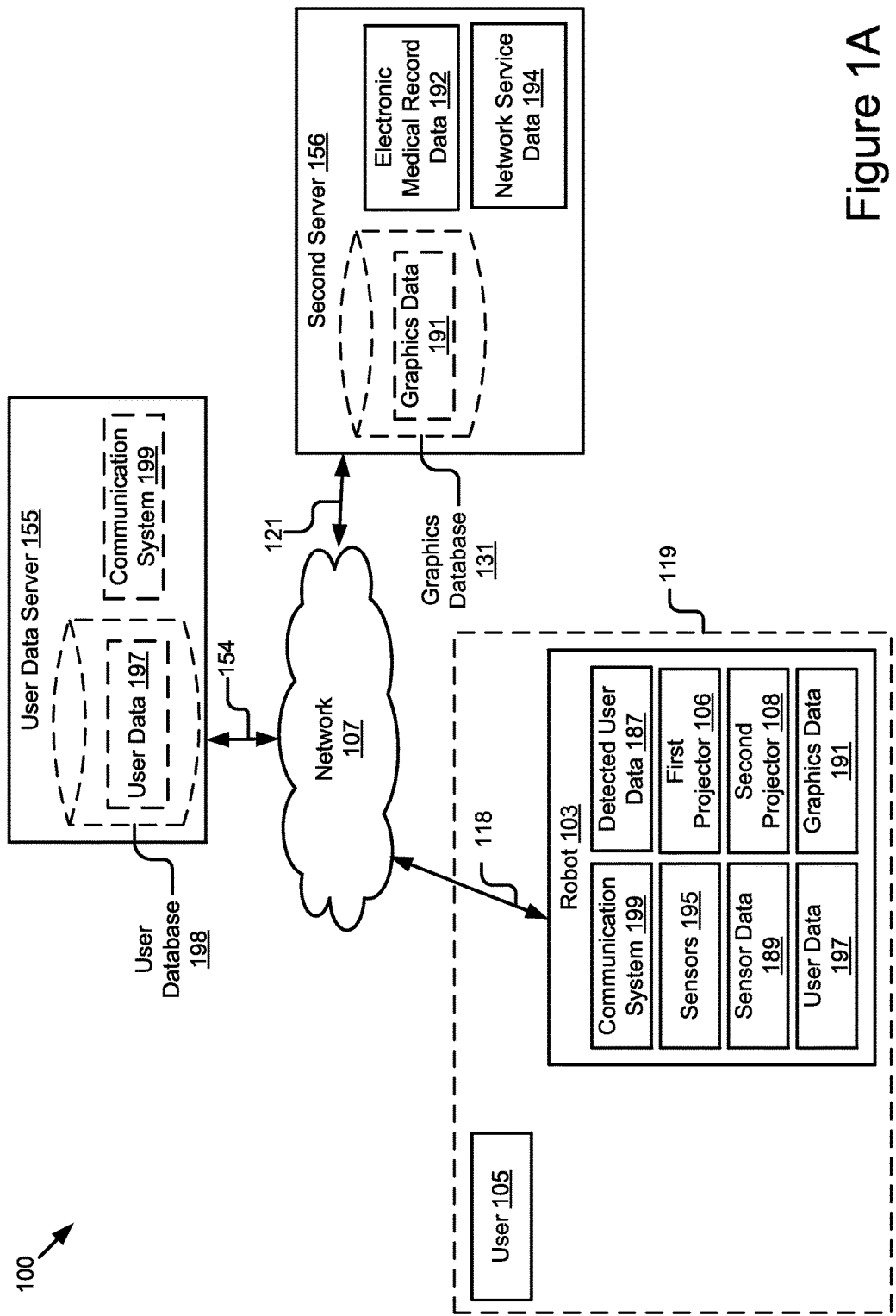
FIG. 1A is a block diagram illustrating an example system including a robot and a communication system to communicate (1) past behavior of the robot, (2) pending behavior of the robot and (3) whether the robot has detected the presence of a user.

People are good at estimating and understanding the behaviors of other people. For example, if two people are walking down a hallway in opposite directions, both people understand that the other person will walk past them and not collide with them.

The situation may be different if one of these people is a robot. For example, if a person and a robot are walking down a hallway in opposite directions, the person is unable to predict the future behavior of the robot. The person also does not know whether or not the robot is aware of their presence, and might collide with them or cause them injury. As a result, the person is likely to feel uncomfortable when in the presence of a robot.

People who are close to an operating robot usually watch it while it passes by them so that they can be sure that they are not in the robot's way. This problem is worse if the robot is not anthropomorphic because then the person is not able to project themselves into the robot's place.

This disclosure describes a robot that includes a communication system configured to enable the robot to communicate (1) past behavior of the robot, (2) pending behavior of the robot and (3) whether the robot has detected the presence of a user. In this way, the communication system enables a user to feel comfortable in the presence of the robot since they have knowledge about what the robot has done, what the robot will do and whether the robot is aware of their presence. Experimentation has shown that users are more comfortable in the presence of robots when they understand the behavior of the robot and do not fear that the robot will collide with them. Accordingly, the communication system described herein enables users to be more comfortable in the presence of robots.

Existing solutions have failed to solve these problems. One existing solution may identify surfaces such as walls and project an image of a human on the wall in the context of a video conference. Such solutions enable the human to use a robot as their proxy for participating in a meeting. However, this solution does not enable the robot to communicate past and pending behavior of the robot and whether the robot has detected the presence of a user. By contrast, the communication system described by this disclosure solves these problems by enabling the robot to communicate (1) past behavior of the robot, (2) pending behavior of the robot and (3) whether the robot has detected the presence of a user.

Another solution consists of a bicycle that projects lanes on either side of the bicycle. However, the projected lanes are static and do not enable a robot to communicate past and pending behavior of the robot and whether the robot has detected the presence of a user. By contrast, the communication system described by this disclosure solves these problems by enabling a robot to communicate (1) past behavior of the robot, (2) pending behavior of the robot and (3) whether the robot has detected the presence of a user.

Yet another solution consists of a robot that projects an image on the floor in front of the robot to indicate the future path of the robot. However, this solution only communicates information to users in front of the robot; it communicates no information to users who are behind the robot. This solution also does not communicate information about the past behavior of the robot. Our research has conclusively proved that including information about the behavior of the robot increases the confidence of the user that they understand the intentions of the robot since they can judge whether the past behavior of the robot is consistent with the future behavior of the robot. Others have been unable to discern the benefit of providing users with information about the past behavior of the robot, and so, they have produced inferior solutions. This solution also does not communicate information about whether the robot is aware of the presence of a user. Our research has shown that users have less fear that a robot will collide with them if they know that the robot is aware of their presence. By contrast, the communication system described by this disclosure solves these problems by enabling a robot to communicate (1) past behavior of the robot for users located behind the robot, (2) pending behavior of the robot for users in front of the robot and (3) whether the robot has detected the presence of a user for any users that are within a predetermined distance from the robot or otherwise detected by the robot.

Accordingly, the present disclosure describes, among other things, a communication system to increase safety and reduce user anxiety and fear in the presence of a robot.

FIG. 1A is a block diagram illustrating an example system 100 including a robot 103 and a communication system 199 to communicate (1) past behavior of the robot 103, (2) pending behavior of the robot 103 and (3) whether the robot 103 has detected the presence of a user 105.

The system 100 includes: a user data server 155 communicatively coupled to a network 107 via signal line 154; a robot 103 communicatively coupled to the network 107 via signal line 118; and a second server 156 communicatively coupled to the network 107 via signal line 121.

While FIG. 1A illustrates one user data server 155, one second server 156, one robot 103, one user 105, the disclosure applies to a system architecture including one or more servers 155, one or more second servers 156, one or more robots 103 and one or more users 105. Furthermore, although FIG. 1A illustrates one network 107 coupled to the entities of the system 100, in practice one or more networks 105 of various types may be connected to these entities.

The network 107 may be a conventional type, wired or wireless, and may have numerous different configurations including a star configuration, token ring configuration, or other configurations. Furthermore, the network 107 may include a local area network (LAN), a wide area network (WAN) (e.g., the Internet), or other interconnected data paths across which multiple devices may communicate. In some embodiments, the network 107 may be a peer-to-peer network. The network 107 may also be coupled to or include portions of a telecommunications network for sending data in a variety of different communication protocols. In some embodiments, the network 107 includes Bluetooth® communication networks or a cellular communications network for sending and receiving data including via short messaging service (SMS), multimedia messaging service (MMS), hypertext transfer protocol (HTTP), direct data connection, WAP, e-mail, etc. In some embodiments, the network 107 may include a GPS satellite for providing GPS navigation to the robot 103. The network 107 may be a mobile data network, for example, 3G, 4G, LTE, Voice-over-LTE ("VoLTE"), Bluetooth Low Energy ("Bluetooth LE") or any other mobile data network or combination of mobile data networks. In some embodiments, the network 107 may be a combination of different networks.

The user 105 may be a human user of the robot 103. In one embodiment, the user 105 is a non-human user of the robot 103 such as a dog, cat or any other non-human animal. In one embodiment, the user 105 may be an elderly person or a person with a medical condition that may benefit from assistance of the robot 103.

The user 105 and the robot 103 may occupy the same user environment 119. The user environment 119 may include any three dimensional space that includes the user 105. The user environment 119 may include tangible objects and surfaces not depicted in FIG. 1A. For example, the user environment 119 may include a floor, walls, etc. The user 105 and the robot 103 may traverse the floor of the user environment 119. For example, the user environment 119 is a room and all the objects in the room such as a table, chair, magazine or other tangible objects located in the area included in the user environment 119. In some implementations, the user environment 119 may be located outdoors, and so, the user environment 119 may not include walls. For example, the user environment 119 may include a city sidewalk which includes one or more users 105 and the robot 103.

The robot 103 may be a processor-based device programmed to the method 300 described below. The robot 103 may also be programmed to provide some or all of the functionality described below with reference to FIGS. 1B and 1C. The robot 103 may include one or more of a motor, an actuator, mobile hardware (e.g., one or more wheels, continuous tracks, legs, etc.) and controller for actuating movements based on a program stored on a tangible memory of the robot 103 and executed by a processor of the robot 103.

The robot 103 may be programmed to communicate one or more of the following to the user 105: (1) past behavior of the robot 103; (2) pending behavior of the robot 103; and (3) whether the robot 103 has detected the presence of the user 105. For example, the communication system 199 of the robot 103 may be programmed to communicate one or more of the following to the user 105: (1) past behavior of the robot 103; (2) pending behavior of the robot 103; and (3) whether the robot 103 has detected the presence of the user 105.

In one embodiment, the robot 103 may be a computing device that includes a tangible or non-transitory memory and a processor. For example, the robot 103 may be a laptop computer, a desktop computer, a tablet computer, a mobile telephone, a personal digital assistant ("PDA"), a mobile e-mail device, a portable game player, a portable music player, a connected device or wearable computer (e.g., a smart watch, smart glasses, fitness tracker, etc.), a television with one or more processors embedded therein or coupled thereto, a vehicle, or other electronic device capable of accessing the network 107. In one embodiment, the robot 103 may be an autonomous vehicle or a semi-autonomous vehicle.

The robot 103 includes one or more of the following elements: a communication system 199; one or more sensors 195; sensor data 189; user data 197; graphics data 191; a first projector 106; and a second projector 108.

The communication system 199 may include code and routines configured to communicate one or more of the following to the user 105: (1) the past behavior of the robot 103; (2) the pending behavior of the robot 103; and (3) whether the robot 103 has detected the presence of the user 105.

In some embodiments, the robot 103 may be programmed to communicate with different robots who do not share the same data transfer protocol as the robot 103. For example, assume there are two robots in a common environment: (1) a first robot; and (2) a second robot. The first robot and the second robot may each include a communication system 199. The first robot and the second robot may not include a common data transfer protocol. Ordinarily, this would mean that the first robot and the second robot could not communicate with one another. However, in some embodiments the communication system 199 described herein solves this problem by beneficially enabling two or more robots who do not share a common data transfer protocol to communicate with one another and make adjustments to their future behaviors based on these communications.

For example, since the first robot and the second robot each include the communication system, they may provide each other with information describing (1) their past behaviors; (2) their pending behaviors; and (3) whether they have detected one another. The communication system 199 may beneficially enable each robot to recognize the path of the other robot and adjust their future behaviors accordingly. The future behaviors may be configured so that the first robot and the second robot do not make contact with one another or any other entities (e.g., users, objects, etc.) in their shared environment. In this way, the communication system 199 beneficially enables two or more robots who do not share a common data transfer protocol to communicate with one another and make adjustments to their future behaviors based on these communications. The communication system 199 may beneficially enable the robots to avoid collisions without using onboard collision avoidance sensors or subsystems. By contrast, robots that do not include the communication system 199 must rely on one or more sensors or subsystems configured to enable the robots to avoid collisions.

In some embodiments, the future behaviors may also be modified so that one or more of the first robot and the second robot modify their speed, acceleration, direction or a combination of these variables. For example, a first robot may project one or more graphics describing the past and pending behaviors of the first robot as well as an indication that the first robot is aware of the presence of the second robot. The second robot which is near the first robot (e.g., within a circular range of 0.1 to 100 feet) may identify the graphics, determine the past and pending behavior of the first robot and then proceed at a faster than normal speed since, for example, the second robot knows that it will not collide with the first robot. The second robot may accelerate upon analyzing the graphics associated with the first robot. By contrast, robots that do not include the communication system 199 would slow down in the presence of another robot since doing so decreases the risk of collision with the other robot.

The communication system 199 will be described in more detail below with reference to FIGS. 1B, 1C, 2 and 3.

In some embodiments, the communication system 199 is stored on a user data server 155. The user data server 155 may include a processor-based computing device that includes a tangible or non-transitory memory and a processor. For example, the user data server 155 may be a laptop computer, a desktop computer, a tablet computer, a mobile telephone, a PDA, a mobile e-mail device, a portable game player, a portable music player, a connected device or wearable computer, a television with one or more processors embedded therein or coupled thereto, a vehicle, or other electronic device capable of accessing the network 107. The user data server 155 may be configured to provide the functionality of the communication system 199 to the robot 103 as a cloud service.

The communication system 199 is depicted with dashed lines in FIG. 1A with reference to the user data server 155 in order to indicate that the communication system 199 is optionally an element of the user data server 155. In one embodiment, the communication system 199 is stored on the robot 103. In one embodiment, the communication system 199 is stored in part on the robot 103 and in part on the user data server 155.

The robot 103 includes one or more sensors 195. Although only one sensor 195 is depicted in FIG. 1A, in practice the robot 103 may include two or more sensors 195 of various kinds. The sensor 195 may include any device that detects or measures physical properties in the user environment 119. For example, the sensor 195 detects physical changes occurring within the user environment 119. The sensor 195 may be used to detect the presence of the user 105. The sensor data 189 stored on the memory of the robot 103 may include data describing the detections or measurements of the sensors 195.

The sensor data 189 may be used by the robot 103 in real time or near real time to determine a navigation path within the user environment 119. The navigation path may include data describing past behavior of the robot 103 (e.g., where the robot 103 has been) and pending behavior of the robot 103 (e.g., where the robot 103 is going). The sensor data 189 may also be used by the robot 103 in real time or near real time to detect the presence of the user 105. The sensors 195 and the sensor data 189 will be described in more detail below with reference to FIGS. 1B, 1C, 2 and 3.

The user data 197 may include data describing one or more user identifiers and one or more graphics associated with the one or more user identifiers. The user identifiers may include one or more unique identifiers associated with one or more users 105. Each user 105 may have a single identifier associated with them that is unique to them among other users 105. The user data 197 may also include one or more graphical identifiers. A graphical identifier may be associated with a user identifier and describe one or more graphics for displaying in association with detecting the user 105 associated with the user identifier. For example, the robot 103 may detect a user 105, determine the user identifier associated with the detected user 105, and determine one or more graphics to display for the user 105 based on the user identifier for the user 105 being associated with the graphical identifier. The graphical identifier will be described in more detail below with reference to the graphics data 191.

In some embodiments, the user data 197 is also stored on a user data server 155. For example, the user data server 155 includes a database which stores the user data 197 and the robot 103 includes wireless communication functionality to transmit queries to the user data server 155 via the network 107 and receive responses to these queries via the network 107. In some embodiments, the user data 197 may be stored on one or more separate servers of the system 100 communicatively coupled to the network 107.

In some embodiments, the user data 197 may be stored on a user database 198. The user database 198 may include a data structure for organizing the user data 197 and providing responses to queries for user data 197. The user data 197 and the user database 198 are depicted with dashed lines in FIG. 1A with reference to the user data server 155 in order to indicate that these elements are optional elements of the user data server 155. The user database 198 and the user data 197 may be stored across one or more elements of the system 100. For example, some or all of the user data 197 may be stored in the user data server 155 and some or all of the user data 197 may be stored in the robot 103. The system 100 may not include the user database 198 while still including the user data 197 stored on a memory of one or more of the user data server 155, the second server 156 and the robot 103.

The user data 197 may include any data describing the user 105. In one embodiment, the user data 197 does not describe a generic user, but instead describes a specific user 105 to be assisted by the robot 103. In one embodiment, the user data 197 may describe one or more of the following: the weight of the user 105; the height of the user 105; the range of motion of one or more joints of the user 105 (the joints of the user may include one or more of the shoulders, elbows, wrists or vertebrae of the user 105); moment limits of the joints of the user 105; the express preferences of the user 105 in general; the express preferences of the user 105 for receiving communications from the robot 103; the inferred preferences of the user 105 based on observation of the user 105 by the sensors 195; the inferred preferences of the user 105 based on input provided by a medical input provider such as a doctor or nurse; and any other biomechanical data related to the user 105 whether express or inferred by the communication system 199.

The graphical identifier included in the user data 197 may point to a graphic included in graphics data 191 stored on the second server 156. The graphics data 191 may describe one or more graphics that may be generated by one or more of the first projector 106 or second projector 108. The graphical identifier and the graphics data 191 will be described in more detail below.

The communication system 199 may detect the presence of one or more users 105. The communication system 199 may store detected user data 187. The detected user data 187 may describe the identity of users 105 detected by the robot 103 (i.e., the user identifier for the detected user 105, which may also be included in the user data 197) and the position of the user 105 within the user environment 119. The position of the user 105 may include one or more of the following: a vector relative to the robot 103; a three dimensional (X,Y,Z) Cartesian coordinate data set describing the location of the user 105 within the user environment 119; GPS coordinates describing the location of the user 105; data that describes the location of the user 105 based on wireless signal triangulation determined based in part on a wireless device (e.g., a smartphone) associated with the user 105.

The robot 103 may include a first projector 106 and a second projector 108 (referred to collectively as "the projectors 106, 108"). The projectors 106, 108 may include hardware optical device that projects a graphical image on a surface. For example, the sensors 195 may detect the presence of the user 105 in the user environment 119. The communication system 199 may determine the location of the user 105 in the user environment 119. The communication system 199 may determine a user identifier associated with the user 105. The communication system 199 may determine graphical data for communicating one or more of the following: (1) the past behavior of the robot 103 (e.g., where the robot 103 has been, or the historical path of the robot 103); (2) pending behavior of the robot 103 (e.g., where the robot 103 is going, or the future path of the robot 103); and (3) and whether the robot 103 is aware of the presence of one or more users 105.

The communication system 199 may provide the graphics data 191 to the projectors 106, 108. The projectors 106, 108 may generate and project graphical images based on the graphics data 191. The projectors 106, 108 may project the graphical images on one or more surfaces. For example, the graphical images may be projected on the floor of the user environment 119.

The projectors 106, 108 may include a type of projector configured to reproduce graphics indoors or outdoors. For example, the projectors 106, 108 may include two or more video graphics array ("VGA") projectors.

The graphics data 191 may include graphical data for generating one or more graphical images to be reproduced by one or more of the projectors 106, 108. The graphical images may describe one or more of the following: (1) the past behavior of the robot 103 (e.g., where the robot 103 has been, or the historical path of the robot 103); (2) pending behavior of the robot 103 (e.g., where the robot 103 is going, or the future path of the robot 103); and (3) whether the robot 103 is aware of the presence of one or more users 105.

The graphical images may include different types of arrows, pictures and drawings in one or more colors. The length of the arrows may indicate the velocity of the robot 103. The width of the arrow may deviate across the length of the arrow to indicate the acceleration of the robot 103 while traveling a path. The head of the arrow may indicate the direction that the robot 103 is traveling along the path. In this way, the arrows may enable the communication system 199 to communicate information about the past and pending behavior of the robot 103.

The graphics data 191 may be enriched or modified by the communication system 199 based on one or more of the user data 197, detected user data 187, sensor data 189, electronic medical record data 192 or the network service data 194. For example, the graphics data 191 may be customized for the user 105 based on the user's proximity to the robot 103 as indicated by the detected user data 187, the current lumens in the user environment 119, the number of users 105 in the user environment 119 or other factors indicated by the sensor data 189. The graphics data 191 may also be customized based on the preferences of the user 105. In one embodiment, the colors or graphics used for the graphical images may be customized for the user 105 based on the electronic medical record data 192. For example, if the electronic medical record data 192 indicates that the user 105 is color blind and cannot see red, then the graphics may include different colors. In one embodiment, the network service data 194 may be incorporated in the graphics data 191 in order to enhance or enrich the user experience or effectiveness of the communication provided by the projection of the graphics data 191. The graphics data 191, electronic medical record data 192 and the network service data 194 are described in more detail below with reference to the second server 156.

The second server 156 may include a processor-based computing device that includes a tangible or non-transitory memory and a processor. For example, the second server 156 may be a laptop computer, a desktop computer, a tablet computer, a mobile telephone, a PDA, a mobile e-mail device, a portable game player, a portable music player, a connected device or wearable computer, a television with one or more processors embedded therein or coupled thereto, a vehicle, or other electronic device capable of accessing the network 107.

The second server 156 may be configured to provide one or more of the network services, the graphics data 191 and the electronic medical record data 192. The second server 156 may store the network service data 194. The network service data 194 may include the data necessary to provide the network services.

In one embodiment, the communication system 199 may include functionality to enable a user 105 to consume network services. The network services may include any service accessible via the network 107. For example, the network services include navigation instructions, streaming audio or video (such as Pandora™, Spotify™, iTunes™, Google Play™, YouTube™, etc.), social networking (such as Facebook™, Google+™, LinkedIn™, Tinder™, QQ™, etc.), microblogging (such as Twitter™, Tumblr™, etc.), online chatting (such as SnapChat™, WhatsApp™, etc.), online content sharing (such as Instagram™, Pinterest™, etc.), e-mail (such as Gmail™, Outlook™, Yahoo! Mail™, etc.), file sharing (such as DropBox™, Google Drive™, MS One Drive™, Evernote™, etc.), calendar and scheduling (such as Google™ Calendar, MS Outlook™, etc.), etc. The network services may also include images from services such as Picasa™, Flickr™, etc. which may be used to enhance the graphics data 191. The network service data 194 stored by the second server 156 may include the data necessary to provide these network services.

The second server 156 may also store the graphics data 191 and the electronic medical record data 192. The graphics data 191 may be stored on a graphics database 131. The graphics database 131 and the graphics data 191 are depicted with dashed lines in FIG. 1A with reference to the second server 156 in order to indicate that these are optional elements of the second server 156. The graphics database 131 may include a data structure for organizing the graphics data 191 and providing responses to queries for graphics data 191. For example, the communication system 199 may provide a user identifier to the graphics database 131 in order to retrieve the graphics data 191 for the user 105 associated with the user identifier. The graphics database 131 and the graphics data 191 may be stored across one or more elements of the system 100. For example, some or all of the graphics data 191 may be stored in the second server 156 and some or all of the graphics data 191 may be stored in the robot 103. The system 100 may not include the graphics database 131 while still including the graphics data 191 stored on a memory of one or more of the user data server 155, the second server 156 and the robot 103.

The electronic medical record data 192 may describe one or more electronic medical records for one or more users 105. The electronic medical record for a particular user 105 may be retrieved based on the user identifier associated with that user 105. For example, the communication system 199 may determine the identity of the user 105 based on the sensor data 189, determine the user identifier associated with the user 105, retrieve the electronic medical record data 192 for the user 105 and determine a communication for the user 105 based on their electronic medical record. For example, if the electronic medical record data 192 for the user 105 indicates that the user 105 is blind in their left eye but not blind in their right eye, the robot 103 may project the communication describing the robot's awareness of the presence of the user 105 so that the communication is to the right side of the user 105, and thus, more likely to be seen by the user 105 who is blind in their left eye but not blind in their right eye.

In some embodiments, one or more of the user data 197, communication system 199, network service data 194, graphics data 191 and electronic medical record data 192 may be stored on one or more separate servers of the system 100 communicatively coupled to the network 107.

In some embodiments, one or more of the user data 197, communication system 199, network service data 194, graphics data 191 and electronic medical record data 192 may be stored on a tangible or non-transitory memory of the user data server 155, second server 156 or the robot 103.

In some embodiments, the communication system 199 may be implemented using hardware including a field-programmable gate array ("FPGA") or an application-specific integrated circuit ("ASIC"). In some other embodiments, the communication system 199 may be implemented using a combination of hardware and software. The communication system 199 may be stored in a combination of the devices and servers, or in one of the devices or servers.

Figure 1B:
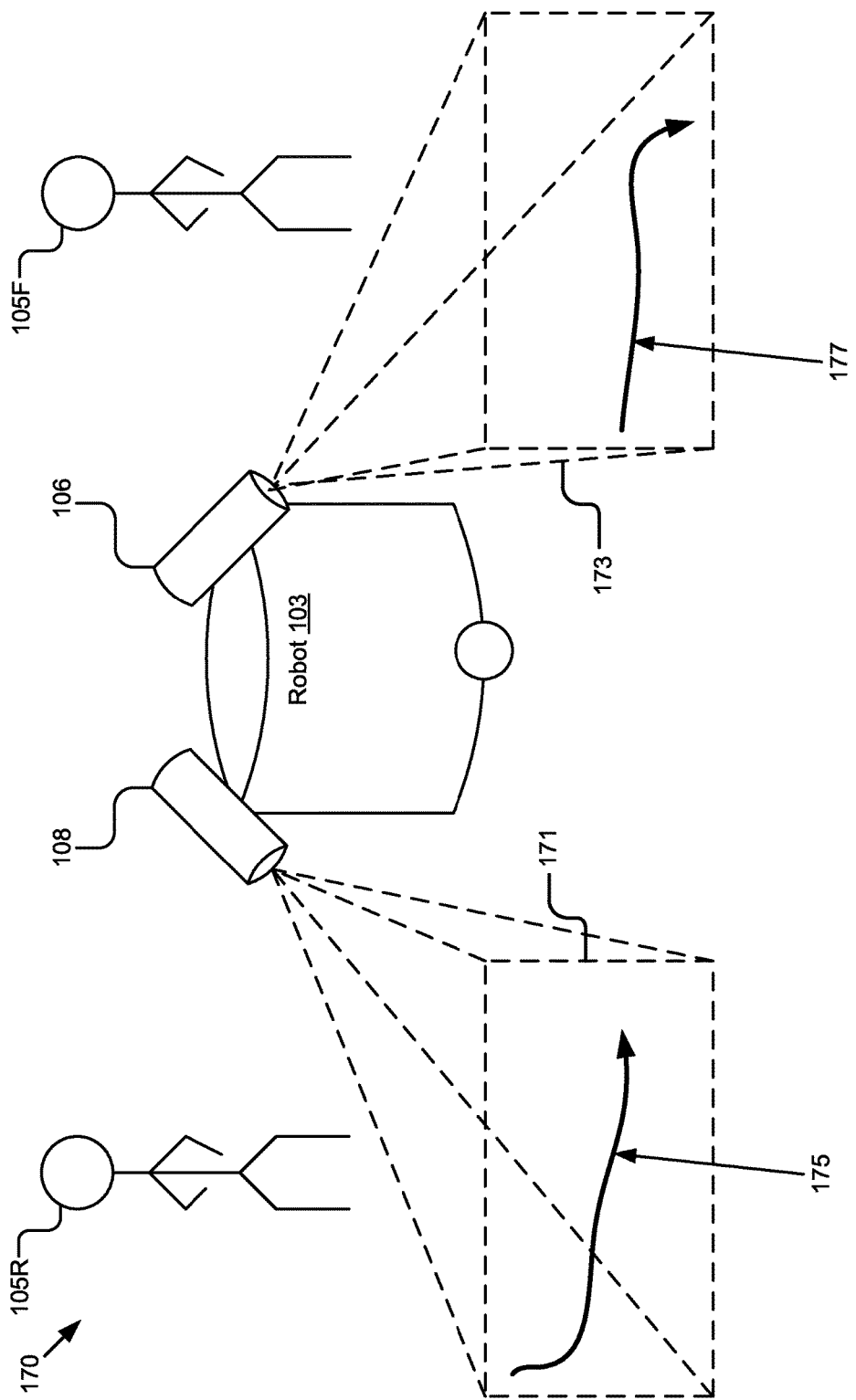
FIG. 1B is a block diagram illustrating an example of a robot communicating past and pending behavior of the robot to a reward user and a forward user.

FIG. 1B is a block diagram illustrating an example 170 of a robot 103 communicating past 175 behavior of the robot 103 and pending 177 behavior of the robot 103 to a rearward facing user 105R and a frontward facing user 105F, respectively.

In this example 170, the second projector 108 is a "rearward facing projector 108" mounted to project images to the rear of the robot 103 and the first projector 106 is a "frontward facing projector 106" mounted to project images to the front of the robot 103.

The rearward projector 108 projects a rearward graphical image 171 which includes the indication of the past behavior of the robot 175. In this example, the past behavior of the robot 175 includes the historical path of the robot 103.

The frontward facing projector 106 projects a frontward graphical image 173 which includes the indication of the pending behavior of the robot 177. In this example, the pending behavior of the robot 177 includes the pending path of the robot 103.

The rearward user 105R may see one or more of the rearward graphical image 171 including the indication of the past behavior of the robot 175 and the frontward graphical image 173 which includes the indication of the pending behavior of the robot 177.

The frontward user 105F may see one or more of the rearward graphical image 171 including the indication of the past behavior of the robot 175 and the frontward graphical image 173 which includes the indication of the pending behavior of the robot 177.

In this example 170, the robot 103 is turning slightly to the right while moving forward. The robot 103 projects the motion or the path of the robot 103 onto the floor to show the past 175 and pending 177 behavior of the robot 103. One or more users 105R, 105F may look at the graphics on the floor and know what the robot 103 will do or how the robot 103 will behave in the future. The robot 103 also projects its past path 175 to its rear for the user 105R who does not face the robot 103. The rearward user 105R may see the graphical image 171 and easily understand that the robot 103 is moving forward and away from the rearward user 105R. Our research has shown that this information 171 may also benefit the frontward user 105F by enabling them to better understand how the past behavior 175 of the robot 103 corresponds to and is consistent with the pending behavior 177 of the robot 103.

Our experimentation has shown that this approach is natural for the users 105R, 105F, reduces their stress and enables them to accurately estimate the future behavior of the robot 103.

Figure 1C:
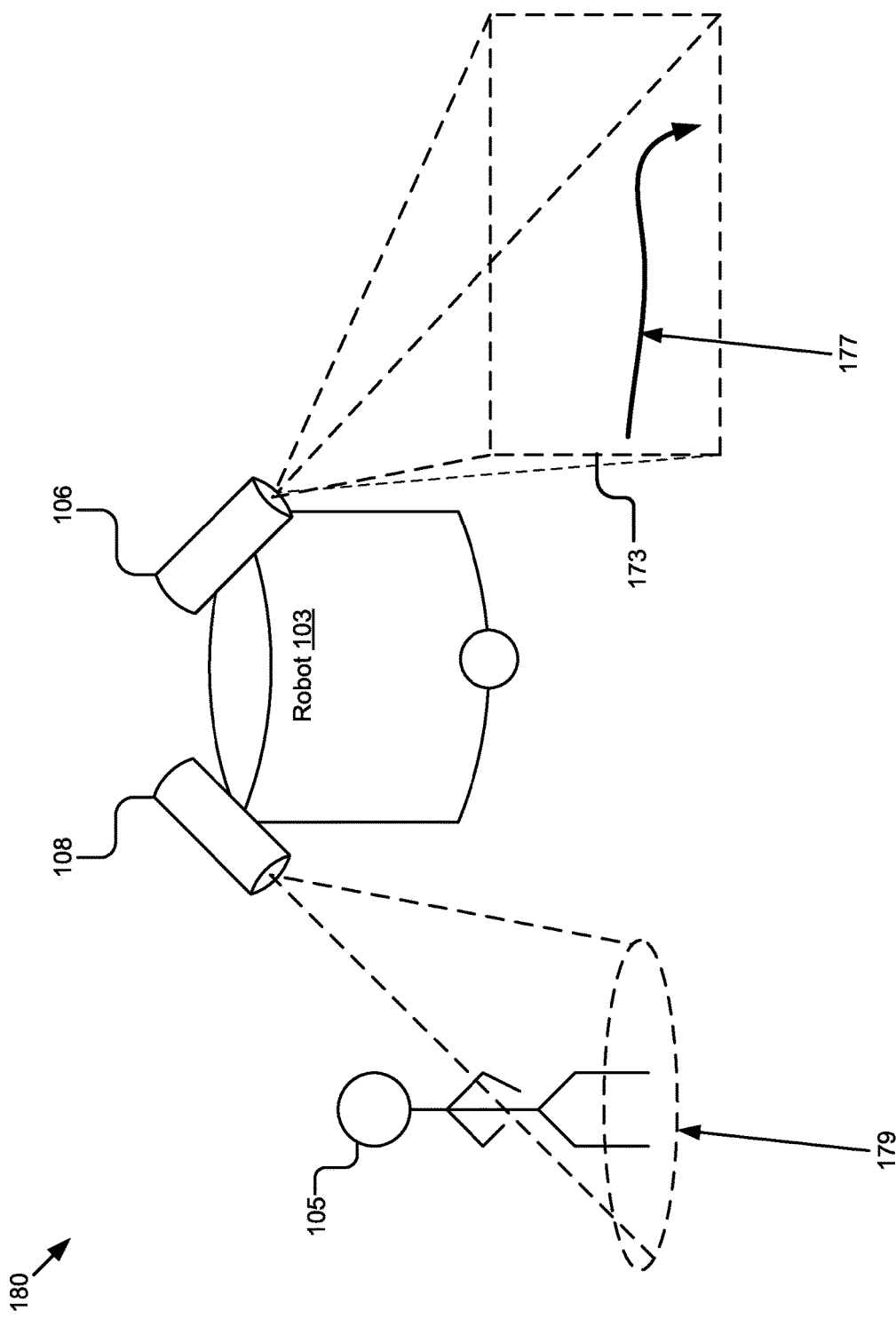
FIG. 1C is a block diagram illustrating an example of a robot communicating pending behavior of the robot to a user and an indication that the robot has detected the presence of the user.

FIG. 1C is a block diagram illustrating an example 180 of a robot 103 communicating pending behavior of the robot 177 to a user 105 and an indication 179 that the robot 103 has detected the presence of the user 105.

In this example 180, the second projector 108 is a "rearward facing projector 108" mounted to project images to the rear of the robot 103 and the first projector 106 is a "frontward facing projector 106" mounted to project images to the front of the robot 103.

The rearward facing projector 108 projects a graphical image 171 which includes the indication 179 that the robot 103 has detected the presence of the user 105. The frontward facing projector 106 projects the frontward graphical image 173 which includes the indication of the pending behavior of the robot 177.

In this example 180, the user 105 is able to know that the robot 103 has detected their presence. As a result, the user 105 is able to know that the robot 103 will not collide with them. The indication 179 that the robot 103 has detected the presence of the user 105 may include a half circle projected on the feet of the user 105 indicating that the robot 103 is aware of their presence. In this way, the user 105 does not have to ask the robot 103 whether they are seen. Our experimentation has shown that this approach is natural for the user 105 and reduces the stress of the user 105.

Example Communication System

Figure 2:
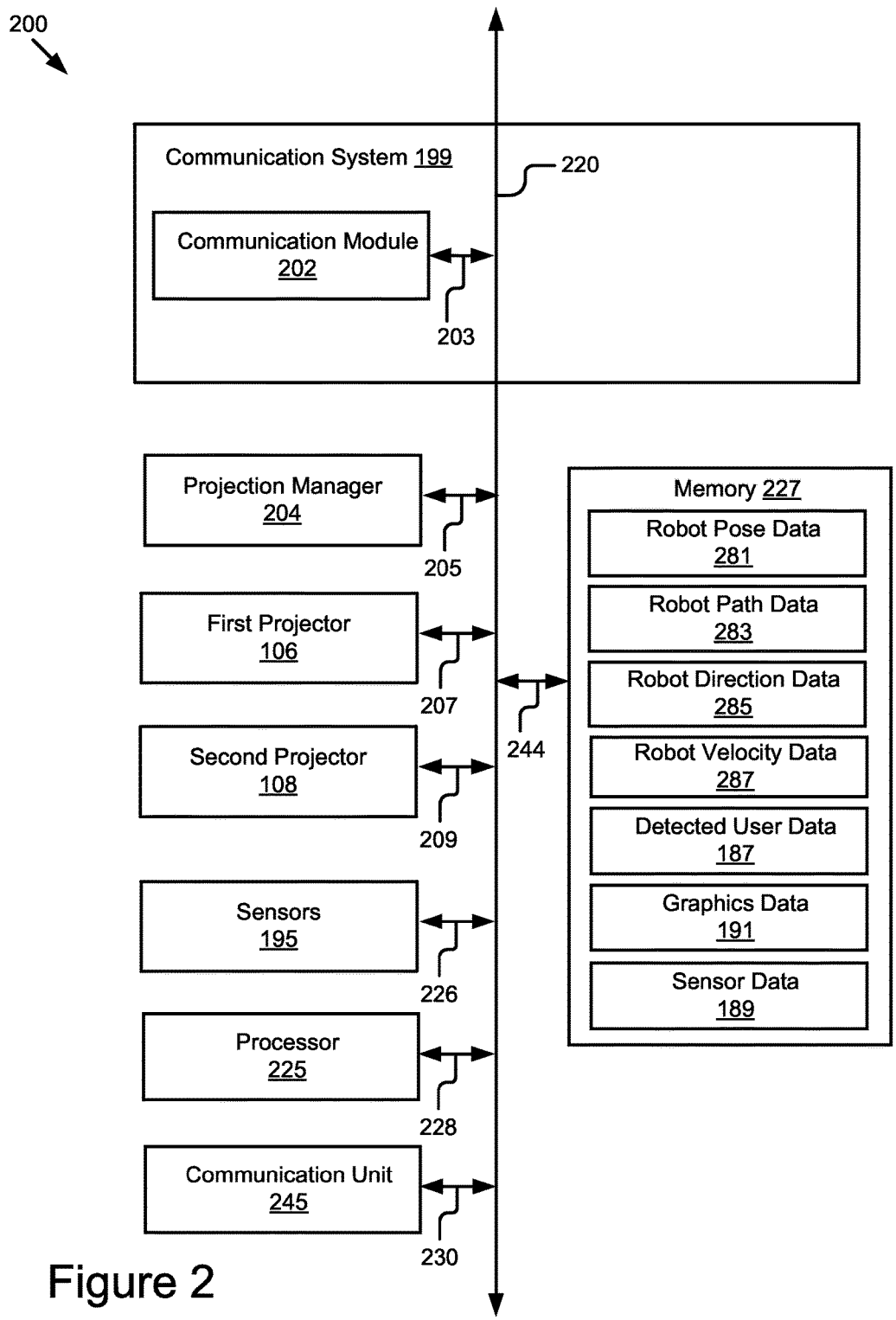
FIG. 2 is a block diagram illustrating an example robot communication system.

Referring now to FIG. 2, an example of the communication system 199 is shown in more detail. FIG. 2 is a block diagram of a system 200. The system 200 may be the user data server 155 or the robot 103 in the system 100 illustrated in FIG. 1. The system 200 may include the communication system 199, a processor 225, a memory 227, a communication unit 245, a projection manager 204, a first projector 106, a second projector 108 and one or more sensors 195, according to some examples. The components of the system 200 are communicatively coupled by a bus 220. Although only one communication system 199, one processor 225, one memory 227, one communication unit 245, one projection manager 204, one first projector 106, one second projector 108 and one sensor 195 are depicted in FIG. 2, in practice the system 200 may include two or more communication systems 199, two or more processors 225, two or more memories 227, two or more communication units 245, two or more projection managers 204, two or more first projectors 106, two or more second projectors 108 and two or more sensors 195.

The processor 225 includes an arithmetic logic unit, a microprocessor, a general-purpose controller, or some other processor array to perform computations and provide electronic display signals to a display device. The processor 225 is coupled to the bus 220 for communication with the other components via a signal line 228. The processor 225 processes data signals and may include various computing architectures including a complex instruction set computer (CISC) architecture, a reduced instruction set computer (RISC) architecture, or an architecture implementing a combination of instruction sets. The processor 225 may include a graphics processing unit. Although FIG. 2 includes a single processor 225, multiple first processors 225 may be included. Other processors, operating systems, sensors, displays, and physical configurations may be possible.

In one embodiment, the processor 225 is programmed to execute one or more steps of a method. For example, the processor 225 is programmed to execute one or more steps of method 300 described below with reference to FIG. 3. The processor 225 or the system 200 may include hardware circuitry configured for execution of one or more of the steps of the method 300. In one embodiment, the processor 225 may be a special-purpose processor programmed to one or more steps of the method 300.

The memory 227 is a tangible or non-transitory computer-readable memory. The memory 227 stores instructions or data that may be executed by the processor 225. The memory 227 is coupled to the bus 220 for communication with the other components via a signal line 244. The instructions or data may include code for performing the techniques described herein. The memory 227 may be a dynamic random access memory (DRAM) device, a static random access memory (SRAM) device, flash memory, or some other memory device. In some embodiments, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2, the memory 227 stores one or more of the following: robot pose data 281; robot path data 283; robot direction data 285; robot velocity data 287; detected user data 187; graphics data 191; and sensor data 189. The memory 227 may also store other data for providing the functionality described herein. For example, the memory 227 may store one or more of a program for controlling the behavior of the robot 103, the user data 197, the electronic medical record data 192 and the network service data 194. The detected user data 187, graphics data 191 and sensor data 189 were described above with reference to FIG. 1A, and so, these descriptions will not be repeated here.

The robot pose data 281 may describe orientations for posing the robot 103. For example, the robot pose data 281 may describe orientations for moving an actuator of the robot 103. For example, the robot pose data 281 may include data describing one or more Cartesian (X,Y,Z) points in space for moving or positioning the robot 103. The robot pose data 281 may further include one or more orientations for positioning the robot 103. The orientations may include one or more yaw, pitch or roll orientations for the moving or positioning the robot 103.

The robot path data 283 may include data describing one or more waypoints for the robot 103. When considered together, the waypoints may describe a path for the robot 103 such as described above with reference to elements 175, 177 of FIGS. 1B and 1C. Accordingly, the path of the robot 103 may be in the form of a series of two or more waypoints described by the robot path data 283.

The robot direction data 285 may include data describing the direction that the robot 103 is facing. The robot direction data 285 may include a vector originating from the center of the robot 103.

The robot velocity data 287 may include data describing one or more of the angular and the linear velocities of the robot 103.

The projection manager 204 may include code and routines configured to determine the graphical images for display by the projectors 106, 108. The projection manager 204 may modify the graphical data for the graphical images based on the requirements of the projectors 106, 108. For example, the projection manager 204 may determine one or more transformations for the graphical images to look non-distorted when projected on the floor of the user environment 119. The projection manager 204 may modify the graphics data 191 to account for the distribution of the graphical components of the graphical images among multiple projectors 106, 108.

The projection manager 204 may include code and routines for determining one or more graphical images from the graphics data 191 for display by the projectors 106, 108 according to one or more of the following elements: the robot pose data 281; the robot path data 283; the robot direction data 285; the robot velocity data 287; the detected user data 187; and the sensor data 189. For example, if the input to the projection manager 204 includes the robot velocity data 287, the projection manager 204 may determine a graphic that includes a curved arrow where: (1) the curvature of the arrow is proportional to the angular velocity of the robot 103; and (2) the length of the arrow is proportional to the linear velocity of the robot 103. The projection manager 204 may also change the color of the determined graphic based on the speed of the robot. The projection manager 204 may also determine one or more graphical images that will notify that the user 105 that they have been detected by the robot 103.

In one embodiment, the memory 227 may include posture data. The posture data may include data describing the posture of the user 105 when reaching for various locations by their right or left hand. The posture data may be based on the observations of the sensors 195. The posture data may be specific to a particular user 105.

In one embodiment, the memory 227 may include user preferences data. The user preferences data may include data describing the preferences of the user 105. The user preferences data may be based on expressed input provided by the user. For example, the user 105 provides answers to questions relating to their preferences for receiving communications from the robot 103 and these answers are stored as user preferences data in the memory 227. The user preferences data may also be based on sensor data 189 determined by one or more sensors 195 observing the user 105 or the user environment 119. The communication system 199 may receive and analyze the sensor data 189 to infer the preferences of the user 105. In one embodiment, the user preferences data is based on any combination of express or inferred preferences of the user 105.

In one embodiment, the memory 227 may include user model data. The user model data may include data describing one or more user models. The user model data may be specific to the user 105. The user model data may be determined by communication system 199 based on any combination of the data described herein including the user data 197 or sensor data 189. The user model data may describe one or more user models for the user 105. The user model described by the user model data may be one or more of a kinematic model describing the user 105, a biomechanical model describing the user 105 or a link model describing the user 105. The robot 103 may use the user model data, for example, when interacting with the user 105 or providing a service to the user 105

In one embodiment, the communication system 199 may determine user model data describing a biomechanical model for the user 105 by analyzing any combination of the data described herein including the user data 197 or sensor data 189 to determine a static distribution of moment or force vectors at one or more of the joints of the user 105.

In one embodiment, the communication system 199 may determine user model data describing a link model for the user 105 by analyzing any combination of the biomechanical model for the user 105, user data 197 or sensor data 189 to determine a linkage representation.

In one embodiment, the memory 227 may include reach simulation data. The reach simulation data may include data describing one or more reach simulations for the user 105. The reach simulation data may be specific to the user 105. The reach simulation data may be determined by the communication system 199 based on any combination of the data described herein including the sensor data 189, the user data 197, the user preferences data or the biomechanical model. For example, the reach simulation data is determined based on (1) the preferences of the user 105 as inferred from observation of the user with one or more sensors 195 and (2) the biomechanical model for the user 105. In one embodiment, the reach simulation may be a reach simulation map. The reach simulation map may be customized for a particular user 105.

The communication unit 245 may transmit and receive data to and from at least one of the user data server 155 and the robot 103 in the system 100. The communication unit 245 is coupled to the bus 220 via a signal line 230. In some embodiments, the communication unit 245 includes a port for direct physical connection to the network 107 or to another communication channel. For example, the communication unit 245 includes a USB, SD, CAT-5, or similar port for wired communication with other entities in the system 100. In some embodiments, the communication unit 245 includes a wireless transceiver for exchanging data with other entities in the system 100 or other communication channels using one or more wireless communication methods, including IEEE 802.11, IEEE 802.16, Bluetooth®, or another suitable wireless communication method.

In some embodiments, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 245 includes a wired port and a wireless transceiver. The communication unit 245 also provides other conventional connections to the network 107 for distribution of files or media objects using standard network protocols including TCP/IP, HTTP, HTTPS, and SMTP, etc.

The communication system 199 may include code and routines configured to provide the functionality described herein. For example, the communication system 199 may include code and routines configured to provide the functionality described below with reference to FIG. 3 when executed by the processor 225. In one embodiment, the communication system 199 may include code and routines configured to provide the functionality described above with reference to FIGS. 1A, 1B, 1C and 2 when executed by the processor 225.

In the illustrated implementation shown in FIG. 2, the communication system 199 includes a communication module 202 and the projection manager 204. The communication module 202 of the communication system 199 is communicatively coupled to the bus 220 via signal line 203. The projection manager 204 is communicatively coupled to the bus 220 via signal line 205. The first projector 106 is communicatively coupled to the bus 220 via signal line 207. The second projector 108 is communicatively coupled to the bus 220 via signal line 209. The projection manager 204 was described above with reference to the memory 227 and the elements of the memory 227, and so, that description will not be repeated here.

The communication module 202 may include code and routines for handling communications between the communication system 199 and other components of the system 200. In some embodiments, the communication module 202 may be a set of instructions executable by the processor 225 to provide the functionality described below for handling communications.

The communication module 202 sends and receives data, via the communication unit 245, to and from one or more of the user data server 155, the second server 156 and the robot 103. For example, the first communication module 202 receives, via the communication unit 245, sensor data 189 from the robot 103 indicating the presence of a user 105, data used to determine the identity or location of the user 105, the express preferences of the user 105, the inferred preferences of the user 105, etc.

In some embodiments, the communication module 202 receives data from components of the communication system 199 and stores the data in the memory 227. In some embodiments, the communication module 202 retrieves data from the memory 227 and sends the data to one or more components of the communication system 199. In some embodiments, the communication module 202 may handle communications between components of the communication system 199. In one embodiment, the communication module 202 receives any combination of sensor data 189, user data 197, robot pose data 281, robot path data 283, robot direction data 285, robot velocity data 287, detected user data 187, graphics data 191, sensor data 189, the user preferences data and the model data described herein. The user data 197 may include, among other things, data describing the express or inferred input of the user 105.

In one embodiment, the preferences of the user 105 may be determined by communication system 199 by analyzing the answers of the user 105 or a medical input provider associated with the user 105 as provided to an electronic or hard copy questionnaire.

In some embodiments, the communication system 199 may be stored in a single server or device. In some other embodiments, the communication system 199 may be distributed and stored across multiple servers or devices. Furthermore, the separation of various components and elements in the embodiments described herein should not be understood as requiring such separation in all embodiments. In some embodiments, the described components, modules or elements can generally be integrated together in a single component or element.

In some embodiments, the communication system 199 can be a set of instructions executable by the processor 225 to provide the functionality described below. In some other embodiments, the communication system 199 may be stored in the memory 227 and accessible and executable by the processor 225 of the system 200. The communication system 199 may be adapted for cooperation and communication with the processor 225 and other components of the system 200. In some embodiments, each of the communication system 225 may be adapted to function as one or more thin clients that are stored and executed by the processor 225 of the system 200.

The first projector 106, second projector 108 and sensors 195 were described above with reference to FIGS. 1A, 1B and 1C, and so, these descriptions will not be repeated here.

In some implementations, the system 200 may include one of more of the following elements: a speaker, a microphone, a controller, a motor, mobile hardware and an actuator according to some examples. These components may be communicatively coupled to the bus 220.

The speaker may include one or more devices configured to playback an audio signal provided by the communication system 199. The speaker may be used by the system 200 to provide audio feedback to the user 105

The microphone may include one or more devices configured to capture an audio signal present in the user environment 119. The microphone may be used by the user 105 to provide input to the system 200.

The controller can be software including routines for determining the movements of the motor, mobile hardware or the actuator. For example, the controller receives the robot pose data 281 and causes an actuator of the robot 103 to move in accordance with the robot pose data 281. In another example, the controller receives the robot path data 283 and causes the mobile hardware to move the robot 103 to the one or more waypoints indicated by the robot path data 283.

The controller may regulate the behavior of the robot 103 to ensure that the robot 103 is positioned in accordance with the robot direction data 285. The controller may also regulate the behavior of the robot 103 to ensure that the robot 103 travels to waypoints in accordance with the robot velocity data 287. The controller may generate velocity constraints for the motor, mobile hardware or the actuator to follow. For example, the controller determines the direction and velocity for moving along a path that is in accordance with the combination of the robot direction data 285 and the robot velocity data 287. Once the controller determines the velocity constraints, the controller may cause the actuator or the motor to move in accordance with the robot pose data 281. In situations where the sensor 195 detects a possible collision for the user 105, the controller 210 either generates new velocity constraints for avoiding a collision or instructs the actuator or the motor to stop moving.

The actuator may include one or more devices used by the robot 103 when moving or manipulating objects in the user environment 119. The actuator may include self-contained motors or be driven by one or more of the motors of the robot 103. The motors of the actuator may be servo motors. For embodiments where the actuator includes its own motors, the controller may instruct the actuator to position the objects based on the robot pose data 281. For embodiments where the actuator is driven by a motor of the robot 103, the controller may instruct the motor of the robot 103 to position the actuator based on the robot pose data 281.

The mobile hardware may include one or more wheels or continuous tracks used by the robot 103 to travel in the user environment 119. The mobile hardware may include self-contained motors or be driven by one or more of the motors of the robot 103. For embodiments where the actuator includes its own motors, the controller may instruct the mobile hardware to position the robot 103 based on the robot path data 283. For embodiments where the mobile hardware is driven by a motor of the robot 103, the controller may instruct the motor of the robot 103 to power the mobile hardware so that the robot is in position based on the robot path data 283.

The motors of the robot 103 may include one or more electronic, hydraulic, or combustion-based motors used to provide power to the actuator or the mobile hardware.

In one embodiment, the sensors 195 of the system 200 may include the microphone and functionality to convert the speech of the user 105 to text. For example, the user 105 may speak to the robot 103 and the system 200 may convert this input to data which is used by the robot 103 to modify one or more of the pose, path, direction and velocity of the robot 103.

In another embodiment, the user 105 may have access to a computer, smartphone, wearable device or similar processor-based device, and this device may include functionality to convert the speech of the user 105 to text and transmit the text to the communication unit 245 of the system 200. For example, the user 105 provides an explicit speech-based instruction for the robot 103 to the smartphone of the user 105, the smartphone converts the speech to text and transmits data describing the explicit instruction of the user to the system 200 via Bluetooth, WiFi, USB or some other communicative coupling between the smartphone and the system 200. The system 200 may then take action based in part on the instruction from the user 105.

In some embodiments, the user 105 may ask the robot 103 for verbal confirmation that the robot 103 is aware of their presence after the robot 103 has provided the visual indication that the robot 103 is aware of the presence of the user 105. The system 200 may then generate audio feedback provided to the user 105 via the speaker of the system 200. In this way, the communication system 199 may provide the user 105 with secondary confirmation that the robot 103 is aware of the presence of the user 105.

In one embodiment, the system 200 includes a keyboard or some other input peripheral and the user 105 may provide input to the system 200. The keyboard may be used by the user 105 to provide inputs such as the user preferences or other instructions for the robot 103.

In one embodiment, the communication system 199 may include functionality to analyze any combination of the data, models or inputs described herein to determine the habits or patterns of the user 105 and determine an estimated next action for the user 105 based on the habits or patterns of the user 105 under similar conditions as indicated by any combination of the data, models or inputs.

In one embodiment, the sensor 195 is a motion detector. For example, the sensor 195 is a gyroscope that measures orientation of the robot 103, user 105 or any other element of the user environment 119. In another example, the sensor 195 is an accelerometer that is used to measure acceleration of the robot 103, user 105 or any other element of the user environment 119. In yet another example, the sensor 195 includes location detection, such as a global positioning system (GPS), location detection through triangulation via a wireless network, etc. In some embodiments, the sensor 195 transmits the location information to the communication system 199 via the communication module 202. In other embodiments, the sensor 195 stores the location information as part of the sensor data 189 in the memory 227.

In some embodiments, the sensor 195 may include a depth sensor. In some embodiments, the depth sensor determines depth using structured light, such as a speckle pattern of infrared laser light. In another embodiment, the depth sensor determines depth using time-of-flight technology that determines depth based on the time it takes a light signal to travel between the camera and an object. For example, the depth sensor is a laser rangefinder. The depth sensor may be used to identify elements of the user environment 119 and their depths. In some embodiments, the sensor 195 transmits the depth information to the communication system 199 for identifying the position of the robot 103, user 105 or any other element of the user environment 119. In other embodiments, the sensor 195 stores the depth information as part of the sensor data 189 in the memory 227.

The sensor 195 may be a camera. The camera may be a physical device for capturing images. In one embodiment, the camera captures electronic images. The camera may include an image sensor, such as a charge-coupled device (CCD) or a complementary metal-oxide semiconductor (CMOS) for converting an optical image to electrical signals. In one embodiment, the camera sends the electrical signals to the communication system 199 for identifying the position of users 105, the robot 103 or objects in the user environment 119. In another embodiment, the camera stores the electrical signals in the memory 227 as part of the sensor data 189.

In some implementations, the communication system 199 may include one or more test images stored on the memory 227. The communication system 199 may compare one or more images captured by the sensors 195 and compare the captured images to the test images to determine the presence of the user 105. For example, the test images may include one or more generic images of different users 105. In another example, the test images may include one or more images of specific users 105. The communication system 199 may determine the similarity of the captured images to the test images to determine the presence of the user 105.

In some implementations, the communication system 199 may include one or more visual classifiers configured to enable the communication system 199 to detect the presence of the user 105. The visual classifiers may be trained as general classifiers to identify the presence of any user 105 or user-specific and trained to identify the presence of a specific user 105.

In some implementations, the sensors 195 may include software for analyzing the captured images and detecting the presence of a face included in the captured images. In this way, the communication system 199 may detect the presence of human users 105 or animal users 105 (e.g., dogs, cats, etc.).

In some implementations, the communication system 199 may determine the presence of users 105 using one or more microphones. For example, the communication system 199 may include code and routines configured to capture noises around the robot 103 and analyze these noises to determine the presence of users 105. In some implementations, the communication system 199 may determine the presence of users 105 using a combination of captured images and the captured noises.

Example Method

Figure 3:
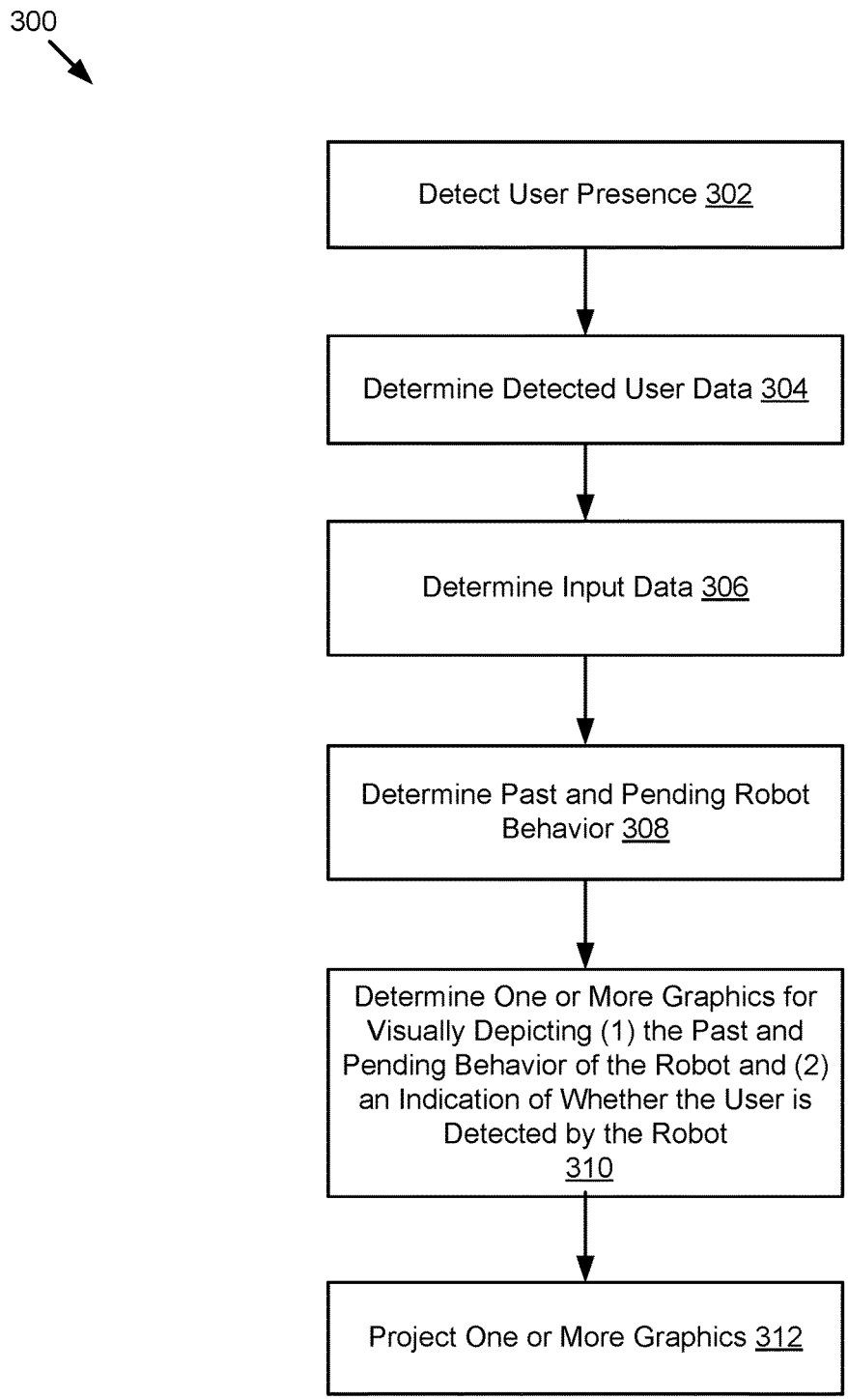
FIG. 3 is a flowchart of an example method for a robot to communicate (1) past behavior of the robot, (2) pending behavior of the robot and (3) whether the robot has detected the presence of a user.

Referring now to FIG. 3, an example method 300 for the robot 103 to communicate (1) past behavior of the robot 103, (2) pending behavior of the robot 103 and (3) whether the robot 103 has detected the presence of a user 105 is described. In one embodiment, one or more blocks of the method 300 may be executed by a processor 225 programmed to execute the one or more blocks.

At block 302, the presence of the user 105 is detected. Block 302 may include detecting the presence of the user 105 based on sensor data 189 describing one or more physical properties included in a user environment 119. The user environment 119 may include the robot 103 and the user 105.

At block 304 the detected user data 187 may be determined. The detected user data 187 may describe the identity of users 105 detected by the robot 103 (i.e., the user identifier for the detected user 105, which may also be included in the user data 197) and the position of the user 105 within the user environment 119. The position of the user 105 may include one or more of the following: a vector relative to the robot 103; a three dimensional (X,Y,Z) Cartesian coordinate data set describing the location of the user 105 within the user environment 119; GPS coordinates describing the location of the user 105; data that describes the location of the user 105 based on wireless signal triangulation determined based in part on a wireless device (e.g., a smartphone) associated with the user 105.

At block 306, the input data may be determined. The input data may describe one or more of the following: the robot pose data 281; the robot path data 283; the robot direction data 285; and the robot velocity data 287.

At block 308, the past and pending behavior of the robot may be determined.

At block 310, one or more graphics may be determined. The one or more graphics may be determined based in part on one or more of: (1) the input data; and (2) the past and pending behavior of the robot.

The one or more graphics determined at block 310 may visually depict: (1) the past and pending behavior of the robot; and (2) an indication of whether the user is detected by the robot.

In some implementations, the graphics may be determined based in part on the robot velocity data 189. The robot velocity data 189 may describe one or more of the following: (1) an angular velocity of the robot 103; and (2) a linear velocity of the robot 103. The graphics describing the past and pending behavior of the robot may include one or more arrows. The one or more arrows may include one or more curved arrows. The one or more curved arrows may be configured so that (1) the curvature of the one or more curved arrows are proportional to the angular velocity of the robot and (2) a length of the one or more curved arrows are proportional to the linear velocity of the robot. Elements 175 and 177 of FIGS. 1B and 1C may include examples of the one or more curved arrows, according to some implementations. In this way, the one or more curved arrows may describe the past and pending behavior of the robot 103.

At block 312, the one or more graphics are projected on a surface of the user environment 119. For example, the one or more graphics may be projected by one or more projectors 106, 108 on the floor of the user environment 119.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments, or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method comprising:
   detecting a presence of a user based on sensor data describing one or more physical properties included in a user environment including a robot and the user;
   determining robot velocity data describing one or more of an angular velocity and a linear velocity of the robot;
   determining, by a processor of the robot, graphical data describing one or more graphics for projection on a floor of the user environment based on the angular velocity and the linear velocity of the robot, wherein:
   the one or more graphics includes a visual indication that the robot has detected the presence of the user and one or more curved arrows describing a past behavior of the robot and a pending behavior of the robot; and
   the one or more curved arrows are configured so that (1) a curvature of the one or more curved arrows is proportional to the angular velocity of the robot and (2) a length of the one or more curved arrows is proportional to the linear velocity of the robot; and
   projecting the one or more graphics on the floor of the user environment so that the user may know that the robot has detected their presence and have access to information describing the past behavior of the robot and the pending behavior of the robot.

2. A method comprising:
   detecting a presence of a user by a robot and, responsive to detecting the presence of the user, the robot executing operations to notify the user that the presence of the user is detected, the operations comprising:
   determining robot velocity data describing one or more of an angular velocity and a linear velocity of the robot;
   determining, by a processor of the robot, graphical data describing one or more graphics for projection on a surface of a user environment based on the angular velocity and the linear velocity of the robot, wherein the one or more graphics includes (1) a visual indication that the robot has detected the presence of the user and (2) one or more arrows describing a past behavior of the robot and a pending behavior of the robot; and
   projecting the one or more graphics on the surface of the user environment so that the user present in the user environment with the robot may have access to information describing the past behavior of the robot and the pending behavior of the robot.

3. The method of claim 2, wherein the one or more arrows include one or more curved arrows configured so that (1) a curvature of the one or more curved arrows is proportional to the angular velocity of the robot and (2) a length of the one or more curved arrows is proportional to the linear velocity of the robot.

4. The method of claim 2, wherein the one or more arrows includes one or more colors that indicate a speed of the robot.

5. The method of claim 2 wherein the operation of detecting the presence of the user is based on sensor data describing one or more physical properties included in the user environment including the robot and the user.

6. The method of claim 2, wherein the one or more graphics include a first graphic including the visual indication that the robot has detected the presence of the user and a second graphic including the one or more arrows describing the past behavior of the robot and the pending behavior of the robot, wherein the first graphic and the second graphic are not the same graphic and the first graphic notifies the user that the robot has detected the user's presence and the second graphic provides the user with the information describing the past behavior of the robot and the pending behavior of the robot.

7. The method of claim 2, wherein the visual indication that the robot has detected the presence of the user is projected at a foot of the user.

8. The method of claim 2, wherein the projecting is performed by a frontward facing projector mounted to the robot and configured to be facing at least substantially forward and a rearward facing projector mounted to the robot and configured to be facing at least substantially rearward.

9. The method of claim 8, wherein the frontward facing projector projects the one or more graphics describing the pending behavior of the robot and the rearward facing projector projects the one or more graphics describing the past behavior of the robot.

10. A robot comprising:
    a processor;
    two or more projectors; and
    a tangible computer readable storage medium storing instructions that, when executed by the processor, cause the processor to detect a presence of a user and, responsive to detecting the presence of the user, perform operations to notify the user that the presence of the user is detected, the operations comprising:

determining robot velocity data describing one or more of an angular velocity and a linear velocity of a robot;

determining graphical data describing one or more graphics for projection on a surface of a user environment based on the angular velocity and the linear velocity of the robot, wherein the one or more graphics includes (1) a visual indication that the robot has detected the presence of the user and (2) one or more arrows describing a past behavior of the robot and a pending behavior of the robot; and projecting, using the two or more projectors, the one or more graphics on the surface of the user environment so that the user present in the user environment with the robot may have access to information describing the past behavior of the robot and the pending behavior of the robot.

11. The robot of claim 10, wherein the one or more arrows include one or more curved arrows configured so that (1) a curvature of the one or more curved arrows is proportional to the angular velocity of the robot and (2) a length of the one or more curved arrows is proportional to the linear velocity of the robot.

12. The robot of claim 11, wherein the one or more arrows includes one or more colors that indicate a speed of the robot.

13. The robot of claim 10 further comprising one or more sensors, wherein the operation of detecting the presence of the user is based on sensor data determined by the one or more sensors, wherein the sensor data describes one or more physical properties included in the user environment including the robot and the user.

14. The robot of claim 10, wherein the one or more graphics include a first graphic including the visual indication that the robot has detected the presence of the user and a second graphic including the one or more arrows describing the past behavior of the robot and the pending behavior of the robot, wherein the first graphic and the second graphic are not the same graphic and the first graphic notifies the user that the robot has detected the presence of the user and the second graphic provides the user with the information describing the past behavior of the robot and the pending behavior of the robot.

15. The robot of claim 10, wherein the visual indication that the robot has detected the presence of the user is projected at a foot of the user.

16. The robot of claim 10, wherein the two or more projectors include a frontward facing projector and a rearward facing projector, and the frontward facing projector is mounted to the robot and configured to be facing at least substantially forward and the rearward facing projector is mounted to the robot and configured to be facing at least substantially rearward.

17. The robot of claim 16, wherein the frontward facing projector projects the one or more graphics describing the pending behavior of the robot and the rearward facing projector projects the one or more graphics describing the past behavior of the robot.

18. The robot of claim 10, wherein the operations further comprise determining a distribution of one or more graphical components of the one or more graphics among the two or more projectors.

19. The robot of claim 10, wherein the operations further comprise determining one or more transformations for the one or more graphics configured so that the one or more graphics appear to the user to be non-distorted viewed on the surface.

20. The robot of claim 10, wherein the robot is a vehicle.

* * * * *